Aug. 20, 1940.   H. S. JANDUS   2,211,821
COMBINED BUMPER AND BUMPER GUARD STRUCTURE
Filed April 24, 1939   2 Sheets-Sheet 1
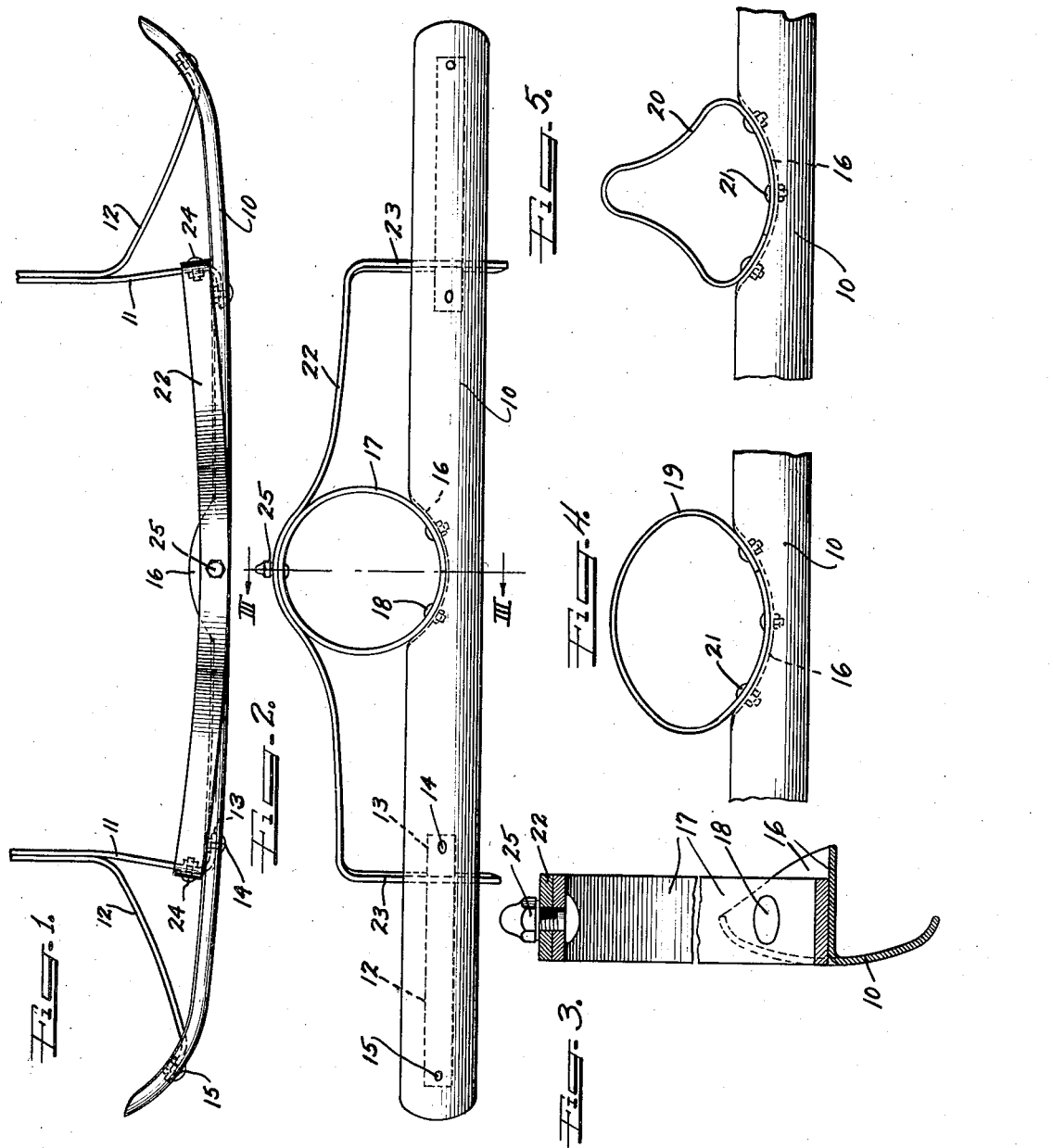
Inventor
HERBERT S. JANDUS Aug. 20, 1940.  H. S. JANDUS  2,211,821
COMBINED BUMPER AND BUMPER GUARD STRUCTURE
Filed April 24, 1939   2 Sheets-Sheet 2
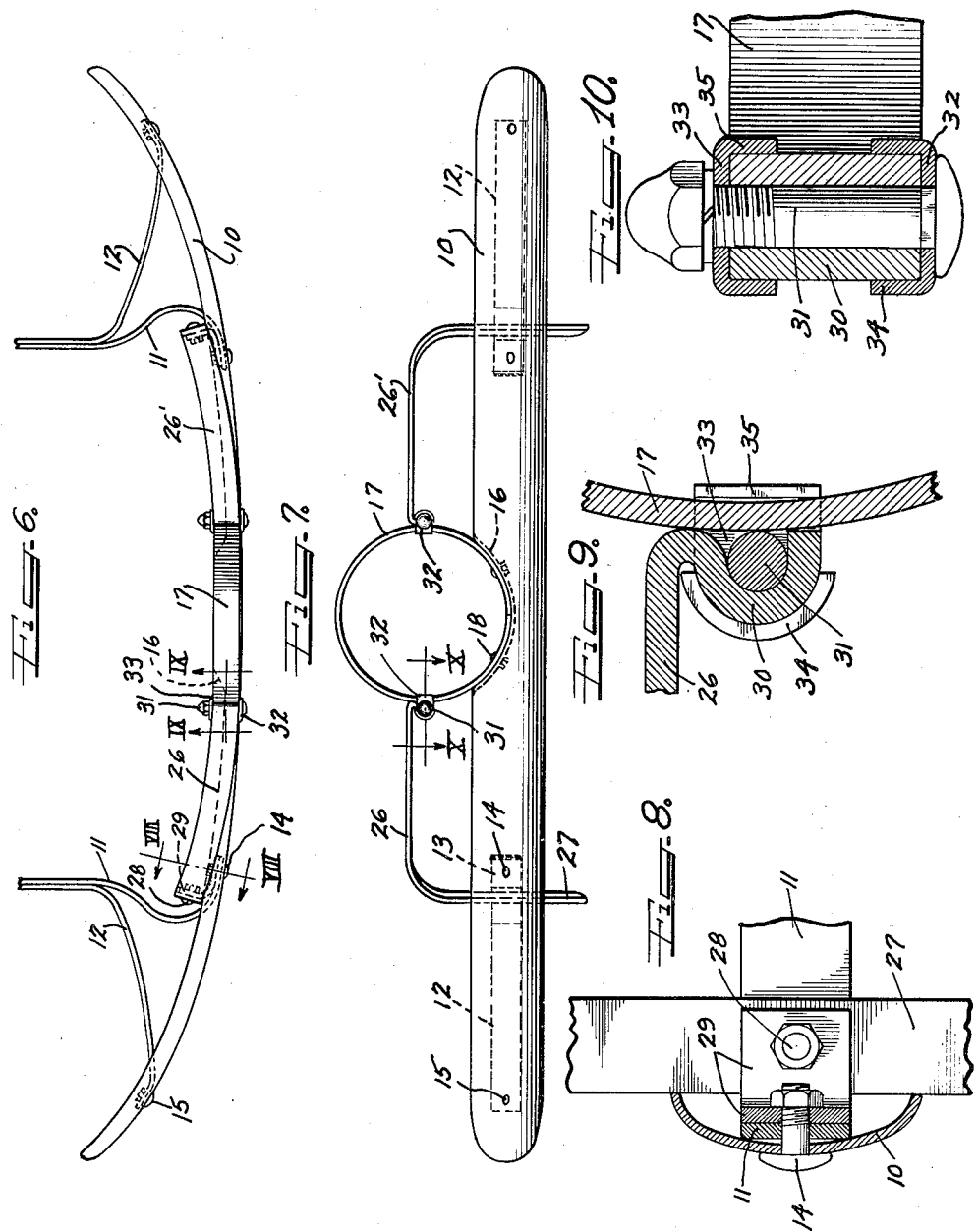
Inventor
HERBERT S. JANDUS.

Patented Aug. 20, 1940

2,211,821

UNITED STATES PATENT OFFICE 2,211,821

COMBINED BUMPER AND BUMPER GUARD STRUCTURE

Herbert S. Jandus, Detroit, Mich., assignor to Houdaille-Hershey Corporation, Detroit, Mich., a corporation of Michigan Application April 24, 1939, Serial No. 269,626

6 Claims. (Cl. 293—55)

This invention relates to a combined bumper and guard structure for vehicles such as automobiles, the object being to provide improved guard structure and mounting thereof on a main bumper structure and with the guard structure arranged to cooperate with the impact bar of the main bumper structure to afford adequate protection against bumper bar interlock and to protect the end of a vehicle body, particularly the radiator and grille structure.

The various features of construction and arrangement of my invention are incorporated in the structure disclosed on the drawings, in which drawings:

Figure 1 is a plan view of a main bumper structure and guard structure thereon;

Figure 2 is a front elevation;

Figure 3 is an enlarged section on plane III—III Figure 2;

Figures 4 and 5 show modified guard elements;

Figure 6 is a plan view similar to Figure 1, showing a modified arrangement;

Figure 7 is a front elevation of the structure of Figure 6;

Figure 8 is an enlarged section on plane VIII—VIII Figure 6;

Figure 9 is an enlarged section on plane IX—IX, Figure 6; and

Figure 10 is an enlarged section on plane X—X, Figure 7.

The main bumper structure shown is of a well known type comprising an impact bar 10 supported from a vehicle by pairs of inner and outer supporting bars 11 and 12 which at their inner ends are secured to the side beams of a vehicle chassis, the inner supporting bars having the laterally inwardly deflected front ends 13 to which the impact bar is secured as by means of bolts 14, and the outer supporting bars 12 deflecting diagonally outwardly to be secured to the impact bar as by bolts 15.

In accordance with my invention, I deflect rearwardly a portion of the impact bar 10 to provide a ledge or seat 16 for mounting a guard element. As shown, the deflected portion is at the middle of the impact bar and above the longitudinal median line of the bar and provides the arcuate seat or flange portion 16. As shown on Figures 2 and 7, the arc of the seat is such that a circular guard element 17 may fit and seat thereon. This guard element may be formed from a single piece of flat metal bar stock and is secured to the seating flange 16 as by bolts or rivets 18.

Figure 4 shows the seat flange of longitudinal curvature to receive an oval shaped guard element 19, while Figure 5 shows a guard element 20 whose upper wall is of substantially inverted V-shape. The guard elements 19 and 20 may be rigidly secured to and supported solely by the seat flange 16 as by bolts or rivets 21, and said guard elements will extend upwardly a sufficient distance in front of a grille or radiator structure to protect said structure against impact by bumpers on other cars.

In order to afford additional protection and the guarding, guard structure 22 may be provided. As shown on Figures 1 to 3, this additional or auxiliary guard element is in the form of a single bar of flat stock extending longitudinally above the impact bar 10 and having its ends 23 deflected downwardly behind the impact bar and permanently secured to the inner supporting bars 11 as by means of bolts 24. At its middle portion, the bar 22 is domed or deflected upwardly with a curvature to receive and fit the top of the guard element, such as a circular guard element 17, and rigidly secured thereto as by a bolt 25. The bar 22 is curved or bowed forwardly in order that its domed middle portion may receive the guard element 17 which, as shown, has its front edge flush with the impact bar 10 along its longitudinal median line. This bowing of the bar gives it greater strength against impact, and the guard structure comprising the guard element 17 and the auxiliary bar 22 materially strengthens the impact bar and together therewith forms a comparatively light but efficient impact resisting bumper and guard assembly.

In the modified arrangement of Figures 6 to 10, the auxiliary guard structure, instead of being in the form of a single bar as in Figures 1 to 3, comprises right and left hand portions 26 and 26' of L-shape, and extending between the guard ring 17 and the impact bar 10. The outer ends 27 of the bars 26 and 26' are deflected downwardly to extend transversely of and behind the impact bar, and are secured, as by means of bolts 28 to L-brackets 29 behind the ends 13 of the inner supporting bars 11, the brackets being secured in place by the bolts 14 which secure the supporting bar ends 13 to the impact bar.

At their inner ends, the bars 26 and 26' are secured by clamps to the opposite sides of the guard ring 17. As shown, the bars at their inner ends are reversely bent to provide loop portions 30 for receiving bolts 31. Front and rear clamping plates 32 and 33 are apertured to receive the bolts 31 and have the arcuate flanges 34 engaging along the outer sides of the loops 30, and inner flanges 35 engaging against the inner side of the guard ring 17 so that when the bolts 31 are applied, the ends of the bars 26 and 26' will be securely clamped to opposite sides of the guard ring 17. By means of the bracket 29 and the clamping structure, the guard bars 26 and 26' may be readily mounted without requiring any drilling of bolt holes in the supporting bars 11 or in the guard ring 17.

It is apparent that guard elements such as 19 and 20, or other shaped guard elements may be substituted for the circular guard element 17, and the auxiliary guard bar structure may be of various shapes and arrangements to meet various conditions and to present the desired ornamental appearance.

The guard structure may be economically formed of ordinary stock bars and secured to the main bumper structure by ordinary bolts, screws or rivets, and as the bars forming the guard structure are all presented edgewise to impact engagement, they can not be readily bent and will therefore afford adequate resistance to impact and protection for the vehicle.

I have shown practical and efficient embodiment of the features of my invention but I do not desire to be limited to the exact construction and arrangement shown and described, as changes and modifications may be made without departing from the scope of the invention.

I claim as follows:

1. A bumper and guard assembly comprising a horizontally extending main impact bar and supporting bars extending therefrom to be secured to a vehicle shaft, said impact bar at its middle point having a portion thereof deflected rearwardly to provide a seat having a longitudinal curvature, a substantially annular guard element fitting on and secured to said seat to extend above the impact bar, and auxiliary guard bar structure secured to said guard element and having its outer ends deflected downwardly and secured to the impact bar.

2. A bumper and guard assembly comprising a horizontally extending impact bar having a portion along the middle thereof deflected at right angles to the bar to provide a seat, a guard ring mounted and secured on said seat, and guard bar structures attached to and extending laterally outwardly from said guard ring and with the outer ends thereof deflected downwardly behind the impact bar and secured relative to the impact bar.

3. A bumper and guard assembly comprising a horizontally extending impact bar having a portion at the middle thereof deflected at right angles to the bar to form an arcuate seat, a guard ring mounted on said seat to extend upwardly from the bar, and auxiliary guard bars clamped to and extending laterally outwardly from said ring and with the ends thereof deflected downwardly transversely of the impact bar and secured relative to the impact bar.

4. A bumper and guard assembly comprising a horizontally extending impact bar having a portion at its middle point deflected at right angles to the bar to provide an arcuate seat, a guard ring mounted on said seat to extend upwardly over the impact bar, auxiliary guard bars clamped at their inner ends to the opposite sides of said ring and having their ends deflected downwardly to extend transversely of the impact bar, and means securing said ends to the impact bar.

5. A bumper and guard assembly comprising a horizontally extending impact bar formed along its middle portion to provide an arcuate seat, a guard ring mounted and secured on said seat to project above the impact bar, guard bars above the impact bar and clamping means detachably securing said bars at their inner ends to the opposite sides of said guard ring, the ends of said bars being deflected downwardly to extend transversely of the impact bar, and means for securing said ends relative to the impact bar.

6. A bumper and guard assembly comprising a horizontal main impact bar extending in a substantially vertical plane throughout its length and having a comparatively short portion at the middle thereof and along its upper edge deflected rearwardly to provide a substantially concave seat, a substantially annular main guard element mounted and secured on said seat to extend upwardly above the impact bar, and auxiliary guard rail structure attached to and extending laterally outwardly from said main guard element and having its ends extending transversely of the main impact bar and secured thereto.

HERBERT S. JANDUS.